United States Patent [19]

Liepold

[11] Patent Number: 5,436,628
[45] Date of Patent: Jul. 25, 1995

[54] PROGRAMMABLE FREQUENCY TIMING GENERATOR WITH PHASE ADJUST

[75] Inventor: Carl F. Liepold, Mesa, Ariz.

[73] Assignee: Intel Corporation, Santa Clara, Calif.

[21] Appl. No.: 120,583

[22] Filed: Sep. 13, 1993

[51] Int. Cl.⁶ .............................................. H03M 1/02
[52] U.S. Cl. ..................................................... 341/110
[58] Field of Search ................ 341/110, 111, 144, 155; 307/269, 590, 591, 262

[56] References Cited

U.S. PATENT DOCUMENTS 4,641,942  2/1987  Sakai et al. ............................ 354/406

FOREIGN PATENT DOCUMENTS

WO86/03633  12/1985  Germany ...................... H03K 23/68
2077969  5/1981  United Kingdom ........ H03K 21/08

*Primary Examiner*—Brian K. Young
*Attorney, Agent, or Firm*—Blakely, Sokoloff, Taylor & Zafman

[57] ABSTRACT

A programmable timing generator for creating a clock signal of variable duty cycle and frequency with a phase adjustment capability. To perform phase adjustment, the invention includes a mechanism which allows a frequency "walking" or phase adjust to be inserted by just adding or subtracting one time constant into the high or low pulse at a certain time interval. In one embodiment, the invention uses two programable counters, with only one counter counting at a time. One counter counts the high phase of a generated output signal and the other counter counts the low phase of the output signal. The two counters, or a single multiplexed counter, allow the "count high" value to be changed while the "count low" value is being generated. The timing generator only creates outputs which change on rising clock edges of an input clock resulting in an output frequency which is directly related to the input clock. The input clock is divided by a value that can be either an integer or non integer value, with steps as small as ¼. The output clock is therefore a certain number of integer clock periods high and a certain number of integer clock periods low.

9 Claims, 4 Drawing Sheets

PROGRAMMABLE FREQUENCY TIMING GENERATOR WITH PHASE ADJUST

BRIEF SUMMARY OF THE INVENTION

A programmable timing generator is disclosed which creates a clock signal of variable duty cycle and frequency whose phase can be adjusted as necessary. Its advantages are its flexibility in producing an output frequency which can be easily changed, but which is in a fixed relationship to an input master clock (thereby eliminating jitter), in a design which can be efficiently integrated (i.e., uses much fewer transistors than would be required by a typical prior art design). This allows a large degree of freedom in areas such as phase adjust in a digital system that reduces jitter which is critical to certain sampling systems.

The invention has application for various timing functions required in digital signal processing (DSP) and other applications which require a programable clock.

In one embodiment, the invention uses two programable counters, with only one counter counting at a time. One counter counts the high phase of a generated output signal and the other counter counts the low phase of the output signal. However, the invention could also be implemented by multiplexing a single counter to count the high phases and the low phases. The two counters, or multiplexed single counter, allow the "count high" value to be changed while the "count low" value is being generated. It should be noted that the timing generator only creates outputs which change on rising clock edges of an input clock resulting in an output frequency which is directly related to the input clock.

The invented timing generator divides the input clock by a value that can be either an integer or non integer value, with steps as small as ¼. The output clock is therefore a certain number of integer clock periods high and a certain number of integer clock periods low.

The invention generates non integer divide ratios by doing sequences of high and low output clock cycles such as 4 high, 3 low, 4 high, 4 low. This produces a divide ratio of 7.5 over two output clock cycles. That is, two output clock cycles are generated over a total of 4+3+4+4 or 15 input clock cycles, resulting in a 2/15 or 1/7.5 divide ratio. Furthermore, the invention allows a frequency "walking" or phase adjust to be inserted by just adding or subtracting one time constant into the high or low pulse at a certain time interval, where a time constant is the length of time of a single input clock cycle.

This design, which can be duplicated for each independent timing generator required for a particular application, can be implemented using much fewer transistors than would be needed using typical prior art timing generator designs. The reason for this is that a typical prior art timing generator would utilize a discrete divider for each desired output frequency as well as separate circuitry to handle phase adjust.

DETAILED DESCRIPTION OF THE INVENTION

Figure 1:
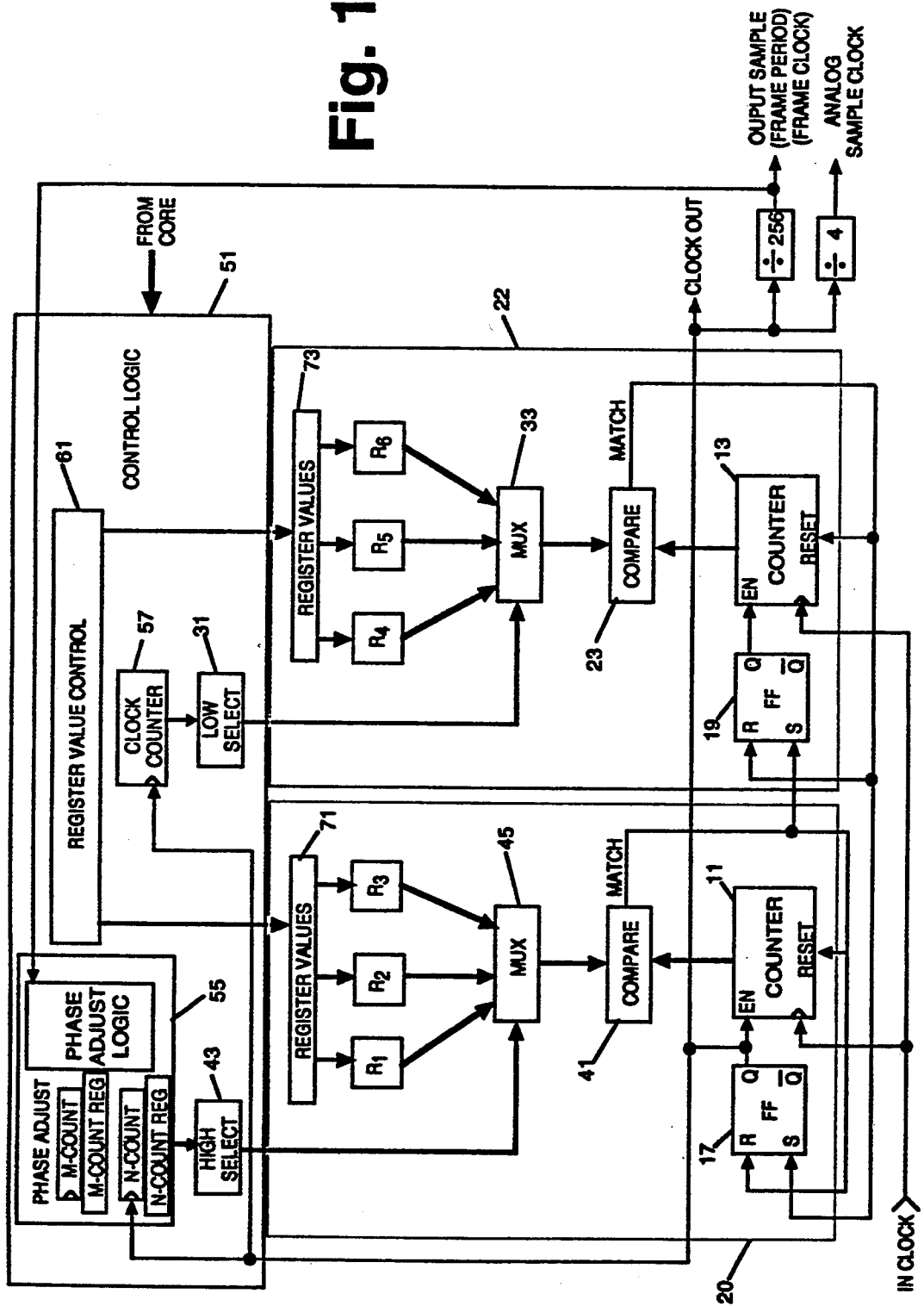
FIG. 1 is a block diagram showing the invented timing generator.

Referring to FIG. 1, an input clock designated IN CLOCK from a crystal oscillator is provided to counters 11 and 13 which count up so long as their enable inputs EN are asserted. However, the circuit design ensures that only one of counters 11 and 13 is enabled at any one time. Specifically, the enable signals are provided by flip-flops 17 and 19 respectively. When flip-flop 17 has its Q output high, (i.e., the output clock CLOCK OUT goes high), the count high section 20 becomes active. At this time, counter 11 has already been reset by a previous count high comparator 41 match signal. The counter 11 starts to count until it reaches the value selected by count high MUX 45 from one of the count high registers R1, R2 or R3. The value it is compared to is the number of input clock cycles that the output clock will be high based upon the value in the selected count high register R1, R2 or R3.

While the high count section 20 is counting, the low count section 22 can be changing the low count value by operation of low select 31 which changes the value selected by the low MUX 33 to change the amount of time the next pulse will be low. When the high count matches the MUX 45 selected value, comparator 41 generates the high match signal which:

i) changes the output clock CLOCK OUT from high to low;
ii) starts the count low section; and
iii) resets the count high section.

The count low section 22 works identically to the count high section 20 except that it counts the number of input clock cycles the output will be low, and the control logic high select 43 changes the value selected by the high MUX 45 to change the amount of time the next pulse will be high.

As previously stated, the generated clock signal is based on the Q output of flip-flop 17 which is also an input to control block 51. Control block 51, in addition to low select 31 and high select 43, includes phase adjust 55 and clock counter 57, each of which is clocked based on the output clock signal designated CLOCK OUT (the Q output of flip-flop 17).

Control logic 51 receives as an input from a processor core data which is used to produce the desired duty cycle and frequency of the output clock and the amount of phase adjust to apply. Typically, this data is 4 bits of parallel data which defines a set of register values controlled by register value control 61 as follows. Specifically, the data input from the processor core is an input code, which represents a desired output clock frequency and duty cycle. This input code selects the register values to be loaded into registers R1-R3 (high clock cycles) and R4-R6 (low clock cycles). For each code (frequency), there is a different set of register values. The register values vary as a function of the oscillator input frequency (IN CLOCK). Thus, the values of R1-R6 are as required for the desired output frequency as determined by the data input from the core. For example, for an input clock frequency of 18.432 MHz, Table I shows the divide ratio and R1-R6 values for a typical set of sample rates. Appropriate R1-R6 values for other sample rates, divide ratios and input clock frequencies should be apparent to persons skilled in the art using the example of Table I.

TABLE I

| Code | Sample Rate | Divide Ratio | R1 | R2 | R3 | R4 | R5 | R6 |
| --- | --- | --- | --- | --- | --- | --- | --- | --- |
| 0000 | 1.2 kHz | 60 | 30 | 31 | 29 | 30 | 30 | 30 |
| 0001 | 1.8 kHz | 40 | 20 | 21 | 19 | 20 | 20 | 20 |
| 0010 | 2.4 kHz | 30 | 15 | 16 | 14 | 15 | 15 | 15 |
| 0011 | 7.2 kHz | 10 | 5 | 6 | 4 | 5 | 5 | 5 |
| 0100 | 8.0 kHz | 9 | 5 | 6 | 4 | 4 | 4 | 4 |
| 0101 | 8.23 kHz | 8-¾ | 4 | 5 | 3 | 5 | 5 | 4 |
| 0110 | 9.0 kHz | 8 | 4 | 5 | 3 | 4 | 4 | 4 |
| 0111 | 9.6 kHz | 7-½ | 4 | 5 | 3 | 4 | 3 | 3 |
| 1000 | 10.29 kHz | 7 | 4 | 5 | 3 | 3 | 3 | 3 |
| 1001 | 11.025 kHz | 4-½ | 2 | 3 | 1 | 3 | 2 | 2 |
| 1010 | 16.0 kHz | 4-½ | 2 | 3 | 1 | 3 | 2 | 2 |

Control logic 51 also includes phase adjust 55 which includes an M-count (plus a sign bit) register and an N-count register. Phase adjust 55 provides a mechanism to move the sample point forward in time or backward in time, i.e., to advance or retard the time a particular sample is taken, on a regular interval by a fixed amount (the fixed amount can be varied by programming). A phase adjust mechanism is necessary for modem or other communication needs where a remote device may have a slightly different crystal frequency and the two need to remain in sync.

The invented timing generator utilizes phase adjust 55 as follows. Assume the timing generator is used with an analog to digital converter which requires 256 output clocks to generate one sample. That is, every 256 output clock cycles, a pulse called FSYNC is generated which causes the analog to digital converter to take a sample of an analog signal to be converted to a digital form and then digitize the sample.

Thus, each FSYNC pulse, the analog to digital converter outputs the conversion result. To move the next analog sample forward or backward in time, one of the 256 output clocks that are required to generate a sample is either "retarded" or "advanced" by one oscillator (input clock) period of time. The adjustment is only made to one of the 256 output clocks. The retard is made by increasing the "high count" value by one crystal (input clock) period, and the advance is made by decreasing the "high count" value by one crystal (input clock) period. Therefore, a retard pushes out the next sample in time by one input clock period, and an advance pulls in the next sample in time by one input clock period.

An example of how the timing generator generates an 8.23 kHz output frequency (times 256) from an 18.432 MHz crystal oscillator input frequency is as follows. The 256 multiplication factor represents the number of output clocks required by the device using the output clocks which, in the example being described is an analog to digital converter which requires 256 output clocks to generate one sample.

First, it should be noted that the divide ratio required for an 8.23 kHz output frequency generated by an 18.432 MHz input clock is 8.75 (8.23 kHz * 256=2106.88 kHz and 18432 kHz/2106.88 kHz=8.75). From Table I above, the R1-R6 values are as follows:

TABLE II

| R1 | R2 | R3 | R4 | R5 | R6 |
| --- | --- | --- | --- | --- | --- |
| 4 | 5 | 3 | 5 | 5 | 4 |

To implement multiples of 0.25 clock periods, four output clock cycles, each cycle having a different length, are needed to define the output frequency. Generally, this is acceptable because in a typical DSP engine in which the invented timing generator would be utilized, oversampling must be utilized with the oversampling ratio being 64 times (divide by four) or 256 times (divide by one) the sample clock rate. Therefore, although each of the four output clock cycles need not be equal length, each set of four clock cycles does need to be the same length.

However, it should be understood that the invention can be used to implement multiples of clock periods other than 0.25 requiring other than four output clock cycles. For example, to implement multiples of 0.20 clock periods, five output clock cycles would be needed. Again, although each of the five output clock cycles need not be of the same length, each set of five output clock cycles would need to be the same length. The changes necessary to produce a programmable frequency timing generator with phase adjust for clock periods other than 0.25 according to the present invention would be readily apparent to persons skilled in the field of the invention.

Figure 2:
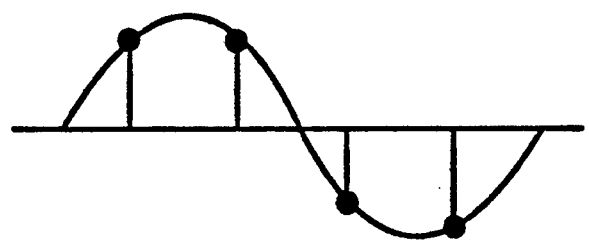
FIG. 2 is a graphical representation showing the basic sampling of an input frequency to provide four output samples per input cycle.

By way of example, basic sampling of an input frequency of approximately 2 kHz would typically use an 8 kHz sample clock which would provide four samples per cycle as shown in FIG. 2.

Figure 3:
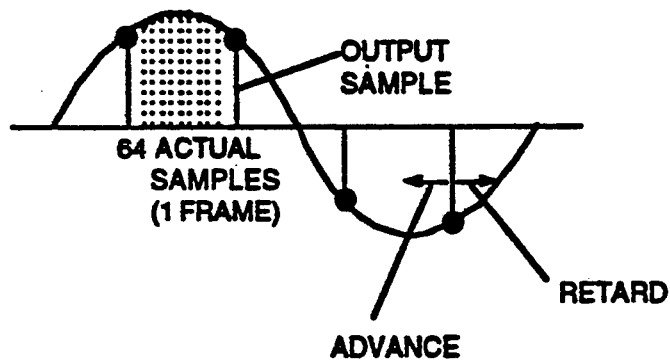
FIG. 3 is a graphical representation showing that for every output sample, there are 64 actual samples as well as an illustration of advancing or retarding a sample.

To provide a better digitized representation of the input signal, oversampling is employed which samples the input at N times the sampling rate. In a case where N is 64, for an 8 kHz sample rate, the effective sample rate is 64 * 8 kHz or 512 kHz. That is, for every output sample, there are 64 actual samples. In the example, each set of 64 samples taken per cycle of the input signal is referred to as a frame. However, 256 CLOCK OUT clock cycles are required per frame since a DSP engine which would utilize this invention runs at four times the analog sample rate. This is shown in FIG. 3 as well as an illustration of advancing or retarding a sample which simply means to move (advance or retard) an output sample one input clock period.

In a typical application, where there are four output samples per input cycle, in addition to generating a clock which is N (in the example 64) times the sampling rate clock, a clock four times faster than this is also needed for a digital signal processor. Thus for an 8 kHz basic sampling rate, where N is 64, a clock of 64 * 8 kHz is needed for the analog sampling and a clock of 4 * 64 * 8 kHz is needed for the digital signal processor. In this manner, a constant analog sample clock is generated.

Referring again to FIG. 1, the R1, R2 and R3 values are the high count register values. The R4, R5 and R6 registers values are the low count register values.

R2 and R3 are used strictly to provide the described phase adjust. R2 is the "retard" value (=R1+1), while R3 is the "advance" value (=R1 −1).

The four clock pulses are generated by four separate high values and four separate low values which are stored in registers R1, R4, R5 and R6 as shown in Table III.

TABLE III

| High 1 | Low 1 | High 2 | Low 2 | High 3 | Low 3 | High 4 | Low 4 |
|---|---|---|---|---|---|---|---|
| R1 | R4 | R1 | R5 | R1 | R4 | R1 | R6 |

Figure 4:
FIG. 4 is a diagram showing a clock signal and a divide by 8.75 with no phase adjust.

Note that R1 is used for all the high phases, R4 is used for the Low 1 phase and the Low 3 phase, R5 is used for the Low 2 phase and R6 is used for the Low 4 phase. Therefore, for the divide by 8.75 register values shown, the clock signal shown in FIG. 4 is produced.

Figure 5:
FIG. 5 is a diagram showing a clock signal and a divide by 8.75 with a retard phase adjust.

In order to adjust the phase, in the example being discussed, only one of 256 High pulses is modified. The example in FIG. 5 shows a retard by varying High 2 (for the purpose of example only) from R1 to R2.

Figure 6:
FIG. 6 is a diagram showing a clock signal and a divide by 8.75 with an advance phase adjust.

The example in FIG. 6 shows a phase adjust advance by varying High 2 (for the purpose of example only) from R1 to R3.

The particular pulse (High 1, High 2, High 3 or High 4) to phase adjust is not important so long as the same High pulse is used as the pulse to be adjusted when necessary.

Phase adjust introduces jitter into the sampling clock. However, this jitter is of a constant nature and only affects one of the 64 analog samples (one of the 256 digital samples which are divided by 4). Because the jitter is constant, and is a small value, the present invention produces a better result over an analog PLL which has a wildly varying jitter that is not constant.

In one embodiment of the invention where it is used to provide a sample clock for a device such as an A/D converter requiring sample rates from 1.2 kHz to 44.1 kHz, counters 11 and 13 are 6 bit counters capable of operating at clock rates up to 75 MHz.

Flip-flops 17 and 19 are RS flip-flops capable of operating at clock rates up to 100 MHz.

Comparators 23 and 41 are 6 bit comparators.

MUXes 33 and 45 are multiplexors capable of handling up to 6 bit inputs with a 2 bit select.

Registers R1–R6 are each 6 bit registers.

Register values 71 and 73 are each a 6 bit wide value for storage in one of registers R1–R6.

Low select 31 is a 2 bit decoder that selects for each four CLOCK OUT cycles, Low1, Low2, Low3 or Low4 one of registers R4, R5 or R6 (with Low1=Low3=R4, Low2=R5 and Low4=R6).

High select 43 is a 2 bit value used to select one of registers R1, R2 or R3 for each four CLOCK OUT cycles, High 1, High2, High3 or High4. It should be noted that high select 43 is normally 0 which causes MUX 45 to select register R1 which is used except during phase adjust. During phase adjust, R2=R1+1 for retard and R3=R1−1 for advance.

Phase adjust 55 comprises two 8-bit registers, two counters (M-count and N-count) and logic which are used to control when to adjust (retard (+) or advance (−)) the sample clock. Phase adjust 55 provides the capability to regularly adjust (+or −) M out of N (clocks/the number of output clocks per frame which in the example is 256). The invented timing generator generates a high speed 256 * Clock (CLOCK OUT) as shown in FIG. 1. The values M and N adjust the CLOCK OUT pulse for each M of N sample output clocks. As noted above, high select 43 is normally 0 (which selects register R1). Phase adjust 55 sets high select 43 to 1 (which selects register R2) or to 2 (which selects register R3) as follows. Firstly, the two 8-bit registers are loaded with M and N values respectively from the core. M is a positive or negative number set under program control to a number from −N to N which represents the number of frames to adjust out of each N frames, with a positive number being a retard which selects register R2 and a negative number being an advance which selects register R3. N is set under program control to a number which indicates the number of frames over which M adjustments are to be performed. For example, if N=10 and M=5, then 5 of every 10 output samples will be adjusted. The M and N counters are initialized with the loaded respective M and N values from the two registers. With each output sample, the N counter is decremented. The M counter is decremented with each output sample whenever an adjustment occurs until the M counter reaches 0. So long as the M counter is not 0, a phase adjust cycle is enabled once per frame and one of the High 2 counts (or High 1, High3 or High4 counts if being utilized as the count to adjust) is adjusted using the value in R2 (if M is negative) or R3 (if M is positive) instead of R1. Once the M counter reaches 0, no further phase adjustment takes place until the N counter reaches 0 indicating that N frames have been processed and the phase adjust cycle can start over again.

Logic in phase adjust 55 causes high select 43 to generate a 0 (selecting R1), 1 (selecting R2) or 2 (selecting R3) as follows. Usually, high select 43 is 0 meaning no phase adjust is performed. When the output sample clock rises, if the sign bit of the M register is negative, high select 43 generates a 1 and if the sign bit of the M register is positive, high select 43 generates a 2. The logic also checks the N counter. A phase adjust can occur only once per rising edge of the output sample clock and only when the M counter is not 0. When the N counter reaches 0, the N and M counters are loaded with the value from the N register and the absolute value from the M register respectively.

By way of example, is M is 10 and N is 33, once every 33 frames, 10 frames will be adjusted by using the value in R2 (which is one less than the value in R1) to retard the one of the High phases of the CLOCK OUT.

Clock counter 57 is a 2-bit counter which counts from 0 to 3 on the rising edge of each CLOCK OUT. It causes MUX 33 to select one of registers R4, R5 or R6. For example, 0 selects R4, 1 selects R5 and, 2 selects R4 and 3 selects R6.

Of course, the register sizes and speeds set forth above may be varied to suit the performance of the timing generator requires for a particular application.

Register value control 61 is a ROM used to look up values for registers R1–R6 for the divide by ratio. From the description set forth herein, a suitable look up table which may be encoded in the ROM for a particular input clock frequency would be readily apparent to persons skilled in the field of the invention. Alternatively, instead of a ROM, a Boolean logic or combinatorial logic circuit could be used to generate the count high/low values.

Figure 7:
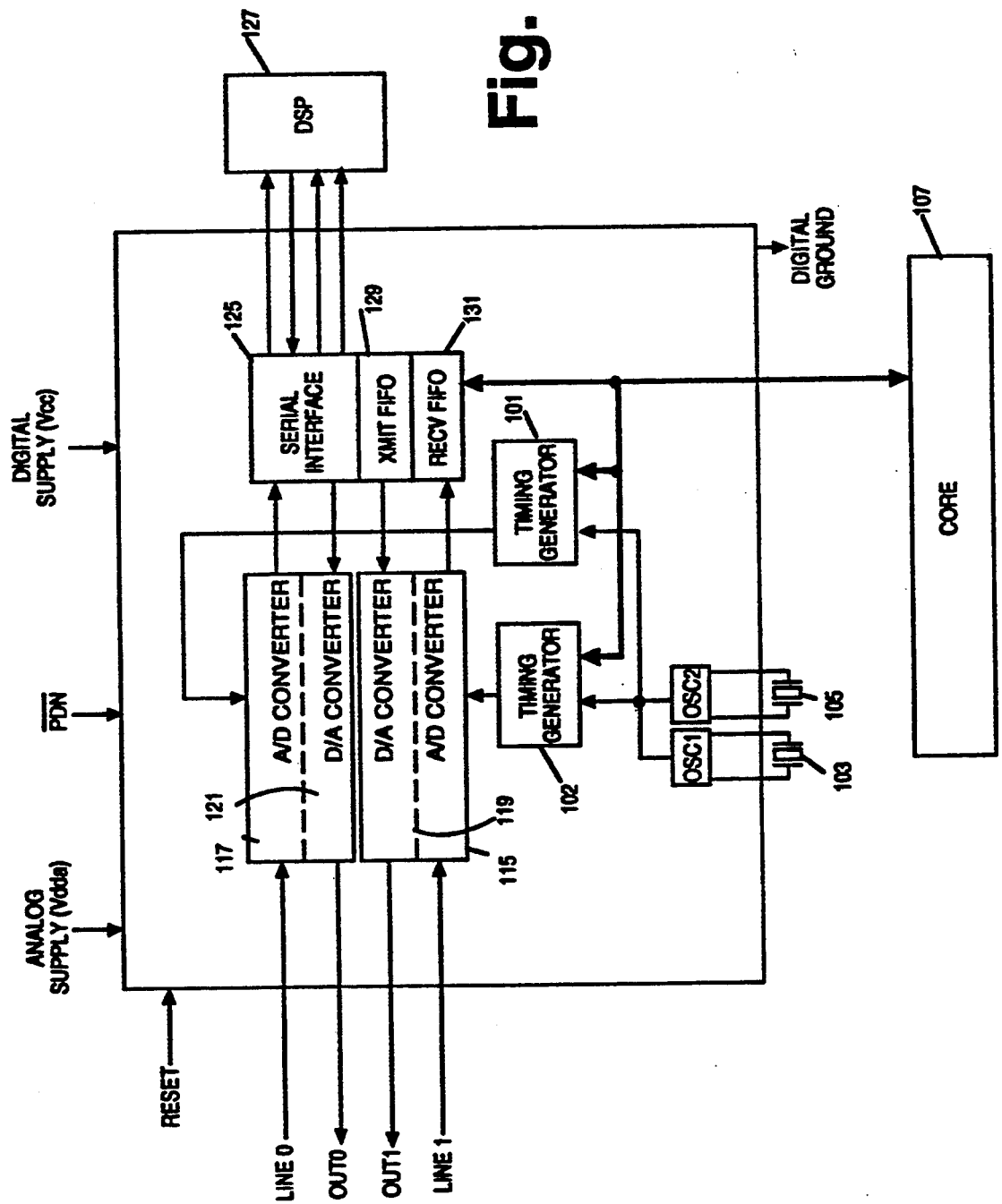
FIG. 7 is a block diagram of a typical system in which the invented timing generator may be utilized.

FIG. 7 is a block diagram showing a system in which the invented timing controller may be used. As shown in FIG. 2, timing generators 101 and 102 receive an input clock from oscillator OSC1 or oscillator OSC2 driven by crystals 103 and 105 respectively. Core 107 provides data used by control logic 51 of the timing generator as described above. The output of timing generator 101 is used to provide timing signals use by A/D converter 115. The output of timing generator 102 is used to provide timing signals use by A/D converter 117o Each A/D converter has a corresponding D/A converter 119 and 121. The A/D converters receive analog input signals from LINE0 and LINE1 respectively and output analog signals OUT0 and OUT1 respectively. The A/D-D/A converter pair 117/121 are coupled through a serial interface 125 to a digital signal processor 127 for processing signals to received from or to be placed on a telephone line. The D/A-A/D converter pair 115/119 communicate with core 107 through a transmit FIFO 129 and a receive FIFO 131 for processing of, for example, voice input from LINE1 and output to be sent to a speaker. In general, the elements described above, other than crystals 103 and 105, core 107 and DSP 127 may be implemented on a single integrated circuit having its own analog and digital supply which may be reset and powered down by RESET and $\overline{PDN}$ signals respectively. The details of the operation of the integrated circuit are not important for an understanding of the invention, but an example of such an integrated circuit may be found in application Ser. No. 08/121,235, filed Sep. 14, 1993, now U.S. Pat. No. 5,386,438, which issued Jan. 31, 1995, where the present invention may be utilized to generate an output clock used by a sample rate generator based upon an oscillator clock input and data provided by a core.

I claim:

1. A timing generator for generating a programmable output clock from an input clock having a first predetermined frequency, said output clock having a programmable frequency and duty cycle such that each set of a predetermined number of output clock cycles has the same length, each of said output clock cycles having a corresponding high phase and low phase, said timing generator comprising:
   a) high phase counting means for counting the number of input clock cycles for each of said high phases;
   b) low phase counting means for counting the number of input clock cycles for each of said low phases;
   c) phase adjustment means for adjusting predetermined ones of the high phases of said output clock cycles to add or subtract an input clock cycle to the length of said predetermined ones of the high phases;
   d) control logic means for setting the input clock cycles required for each of said high phases and each of said low phases.

2. The timing generator defined by claim 1 wherein said high phase counting means comprises:
   a) a first flip-flop having R and S inputs and a Q output;
   b) a first counter having an enable input coupled to the Q output of said first flip-flop, a clock input coupled to said input clock and a reset input;
   c) a first comparator coupled to said first counter and adapted to receive the content of said first comparator as one value to be compared;
   d) a first multiplexor coupled to said first comparator, said multiplexor adapted to pass to said first comparator a second value to be compared, wherein said first comparator upon determining that said two values to be compared are equal, generates a MATCH signal which is input to the reset input of said first counter and the R input of said first flip-flop.

3. The timing generator defined by claim 2 wherein said low phase counting means comprises:
   a) a second flip-flop having R and S inputs and a Q output, said S input adapted to receive said MATCH signal generated by said first comparator;
   b) a second counter having an enable input coupled to the Q output of said second flip-flop, a clock input coupled to said input clock and a reset input;
   c) a second comparator coupled to said second counter and adapted to receive the content of said second comparator as one value to be compared;
   d) a second multiplexor coupled to said second comparator, said multiplexor adapted to pass to said second comparator a second value to be compared, wherein said second comparator upon determining that said two values to be compared are equal, generates a MATCH signal which is input to the reset input of said second counter, the R input of said second flip-flop and the S input of said first flip-flop.

4. The timing generator defined by claim 1 wherein a frame is equal to the length of one cycle of an input signal being sampled and said phase adjustment means comprises:
   a) a first register which is loaded with a first predetermined number representing how often a phase adjustment is to be made per set of frames;
   b) a first counter coupled to said first register which is adapted to be loaded with said first predetermined number and decremented each output clock cycle;
   c) a second register coupled which is loaded with a second predetermined number representing the number of frames over which said phase adjustments are to be made;
   d) a second counter coupled to said second register which is adapted to be loaded with said second predetermined number and decremented once per frame;
   e) phase adjust logic means coupled to said first counter, said second register, and said second counter for passing a value to said control logic means which is used to set the input clock cycles required for each of said high phases.

5. The timing generator defined by claim 3 wherein said control logic means comprises:
   a) register value control means for providing values used by said low phase counting means to determine the number of input clock cycles for each of said low phases and by said high phase counting means to determine the number of input clock cycles for each of said high phases;
   b) low value select means coupled to said second multiplexor means for selecting a predetermined one of said values provided by said register value control means to pass to said second comparator means.

6. The timing generator defined by claim 5 wherein said low phase counting means further comprises a set of registers coupled between said register value control means and said second multiplexor means for storing said values provided by said register value control means.

7. The timing generator defined by claim 2 wherein said high phase counting means comprises a set of registers coupled to said first multiplexor means for storing values representing for each of said high phases, a predetermined number of input clock cycles.

8. A timing generator for generating a programmable output clock from an input clock having a first predetermined frequency, said output clock having a programmable frequency and duty cycle such that each set of four output clock cycles has the same length, each of said four output clock cycles having a corresponding high phase and low phase, said timing generator comprising:
- a) high phase counting means for counting the number of input clock cycles for each of said four high phases;
- b) low phase counting means for counting the number of input clock cycles for each of said four low phases;
- c) phase adjustment means for adjusting predetermined ones of the high phases of said output clock cycles to add or subtract an input clock cycle to the length of said predetermined ones of the high phases;
- d) control logic means for setting the input clock cycles required for each of said four high phases and each of said four low phases.

9. A system for converting analog signals to digital signals and digital signals to analog signals for transmission of data and voice signals over a network comprising:
- a) a first analog to digital/digital to analog converter coupled to a first timing generator and a serial interface means for coupling to a digital signal processor;
- b) a second analog to digital/digital to analog converter coupled to a second timing generator and a transmit receive FIFO means for coupling to a source of data to be processed;
- c) first and second clock source means coupled to said first and second timing generators for providing a predetermined clock signal;

wherein said first and second timing generators each include:
- i) high phase counting means for counting the number of input clock cycles for each of said high phases;
- ii) low phase counting means for counting the number of input clock cycles for each of said low phases;
- iii) phase adjustment means for adjusting predetermined ones of the high phases of said output clock cycles to add or subtract an input clock cycle to the length of said predetermined ones of the high phases;
- iv) control logic means for setting the input clock cycles required for each of said high phases and each of said low phases.

* * * * *

UNITED STATES PATENT AND TRADEMARK OFFICE
CERTIFICATE OF CORRECTION

PATENT NO. : 5,436,628
DATED : July 25, 1995
INVENTOR(S) : Carl F. Liepold It is certified that error appears in the above-identified patent and that said Letters Patent is hereby corrected as shown below:

Title page,
In the Abstract at [57] at line 8 delete "programable" and insert --programmable--

In column 1 at line 21 delete "programable" and insert --programmable--

In column 1 at lines 23 and 24 delete "programable" and insert --programmable--

Signed and Sealed this

First Day of July, 1997

Attest:

BRUCE LEHMAN

Attesting Officer

Commissioner of Patents and Trademarks